Jan. 2, 1962     K. H. SCHWEITZER     3,015,493
CLOSURE MEANS FOR LEG OPENINGS FOR USE IN BABY SEAT ASSEMBLIES
Filed Oct. 6, 1958     2 Sheets-Sheet 1

INVENTOR.
KURT H. SCHWEITZER
BY
ATTORNEY

Jan. 2, 1962   K. H. SCHWEITZER   3,015,493
CLOSURE MEANS FOR LEG OPENINGS FOR USE IN BABY SEAT ASSEMBLIES
Filed Oct. 6, 1958   2 Sheets-Sheet 2
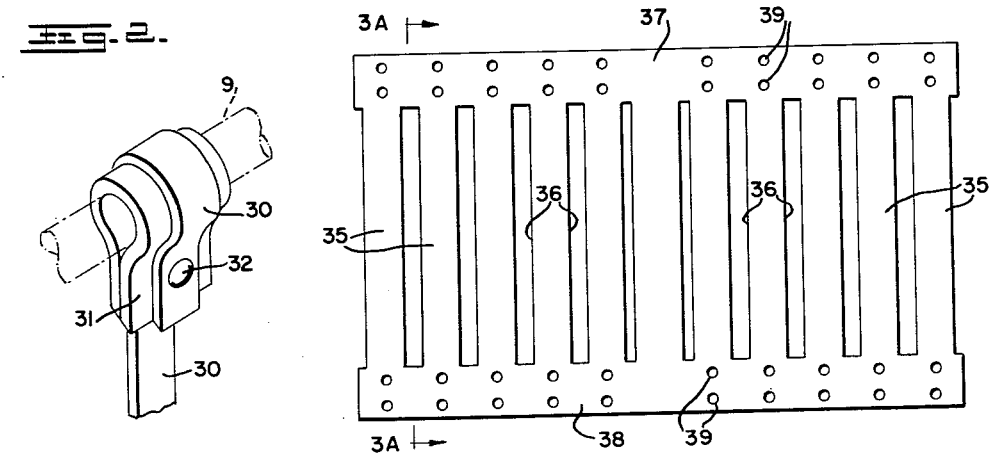
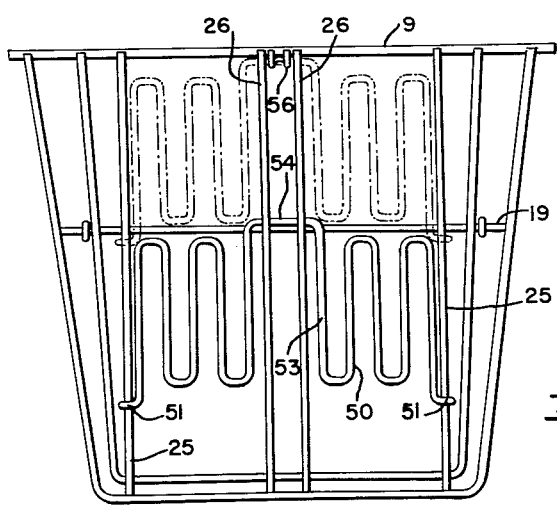
INVENTOR.
KURT H. SCHWEITZER
BY
ATTORNEY

United States Patent Office 3,015,493
Patented Jan. 2, 1962

3,015,493
CLOSURE MEANS FOR LEG OPENINGS FOR USE IN BABY SEAT ASSEMBLIES
Kurt H. Schweitzer, 100 SE. 2nd St., Oklahoma City 2, Okla.
Filed Oct. 6, 1958, Ser. No. 765,362
9 Claims. (Cl. 280—33.99)

This invention relates to improvement in baby seat assemblies such as are conventionally used in nesting grocery carts of the general type shown in Goldman Patent No. 2,689,133, dated September 14, 1954, these nesting grocery carts including a forwardly converging basket structure and a rear hinged gate. The rear hinged gate is adapted to swing from an upright closing position to an upper generally horizontal position when the carts are nested.

It has proven advantageous, in some instances, to mount on the swinging rear gate of a nesting cart a folding baby seat, this folding seat being constructed to collapse against the rear gate or to be opened to seating position with the child facing rearwardly. When the seat is to be used it is necessary that leg openings be provided in the rear gate to permit a child's legs to project therethrough. When the seats are in open position and not occupied by a child, it has become customary to used the space provided by the open seat for holding fragile commodities and this requires a closure means for the leg openings such as shown in my co-pending application Serial No. 505,280, filed May 2, 1955, now Patent No. 2,860,885, dated November 18, 1958. In my prior application the closure for the leg openings is in the form of a plate which is independently hinged for swinging movement to an upright position closing the leg openings or to a horizontal position forming a seat cover.

It is the object of the instant invention to provide novel closure means for the leg openings in a hinged gate of a nesting grocery cart.

Another object of the invention is to provide semi-permanent closure means for the leg openings, i.e., closure means normally in position for closing the leg openings but capable of distortion or displacement when a child is positioned on the seat.

Another object of the invention is to provide a closure means for the leg openings supported by and movable with the swinging gate, the closure means being in the form of a sliding element movable in the plane of the hinged gate and which can be displaced downwardly from the leg openings or moved upwardly for closing the latter.

These and other objects of the invention will more clearly hereinafter appear by reference to the accompanying drawings forming a part of the instant specification, wherein like characters of reference designate corresponding parts throughout the several views, in which:

FIG. 1 is a perspective view of a baby seat assembly for nesting grocery carts embodying one form of the present invention;

FIG. 1ª is a section on line 1ª—1ª of FIG. 1;

FIG. 2 is a fragmentary perspective view showing the connection at the end of one of the closure straps illustrated in FIG. 1;

FIG. 3 shows a modification of a flexible closure sheet for the leg openings of a hinged gate of a nesting cart in which the entire closure sheet is formed as an integral structure;

FIG. 3ª is a section on line 3ª—3ª of FIG. 3;

FIG. 4 is a perspective view of the rear of a hinged gate assembly in which the closure for the leg openings is carried by a spring roller; and FIG. 5 is a rear view of a grocery cart showing the closure of the leg openings in the form of a sliding frame.

Figure 1:
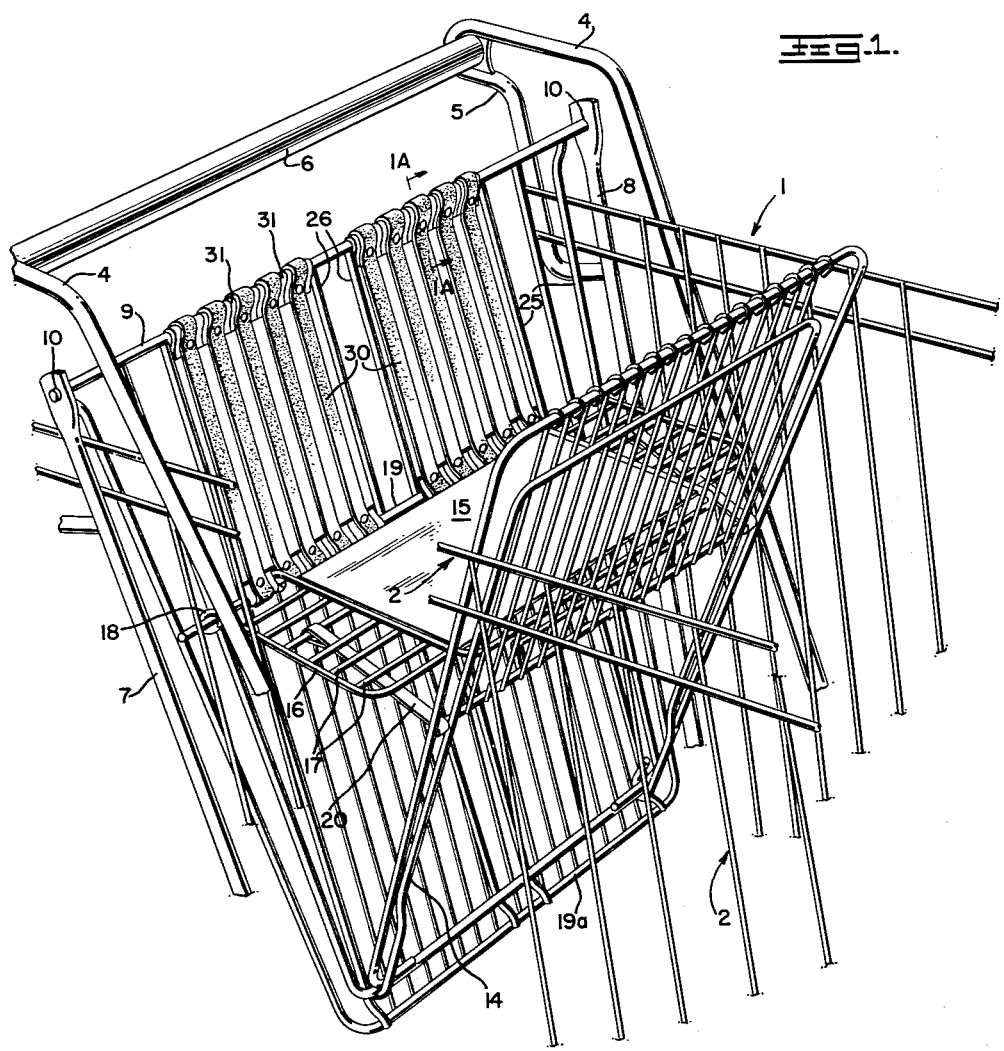
Figure 1A:
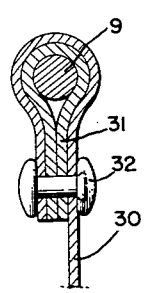

Referring to the perspective view shown in FIG. 1, a rear portion of a nesting cart is illustrated embodying a portion of the side panels 1 and 2, rearwardly projecting rear frame members 4 and 5 supporting the handle 6, and vertical frame members 7 and 8 at each side of the basket mounting the cross bar 9 which pivotally supports the swinging gate and which is mounted by pivots 10 at the upper portions of the frame members 7 and 8. In this view the conventional baby seat assembly is shown as including the hinged gate and the panel assembly 14 which is mounted at the lower portion of the gate so that it is capable of swinging movement towards and away from the hinged gate assembly. The seat supporting structure is illustrated at 15 and embodies a frame member 16 with cross bars 17, the frame member 16 being hinged at 18 to a cross brace 19 extending medially of the hinged gate assembly. Links 20 connect the seat frame 15 and the panel 14 so that when the panel is moved rearwardly towards the hinged gate, or outwardly from the gate, the seat supporting structure will simultaneously be moved upwardly against the hinged gate or downwardly away from said gate.

It will be noted that the hinged gate is formed of horizontal braces 9, 19 and 19ª, these braces being connected by vertical frame members 25 spaced outwardly of the gate and intermediate upright frame members 26 positioned centrally of the gate structure. Defined by the outer frame members 25 and intermediate frame members 26 and between the upper horizontal brace 9 and the medial brace 19 are leg openings through which a child's legs extend when located upon the seating surface. Obviously, when the panel 14 is swung outwardly from its position against the hinged gate there will be a receptacle provided except for the leg openings and it has become customary to place frangible commodities in this receptacle. As might be expected, these frangible commodities can escape through the leg openings and the present invention provides means for closing the leg openings and yet permitting the child's legs to extend therethrough when required.

In FIGS. 1 and 2 vertical straps are permanently positioned between the horizontal rods 9 and 19 and a sufficient number of these straps are located at each leg opening to prevent escape of commodities which may be contained in the receptacle defined by the side wall of the vehicle, the seat support, the top part of the panel and the top part of the swinging gate.

The straps, as indicated by reference character 30, are mounted at their extremities on spacing members 31, as best shown in FIG. 2. These spacing members 31 may be of any width and likewise the straps 30 may be of any desired width and thickness. By having the spacing members of different widths the number of straps used to close a leg opening will be varied. The straps 30 are shown as removable and replaceable and the extremities of the straps 30 are secured to the spacing members 31 by snap fasteners 32. Likewise, the spacing members may have separable connections for securing their terminals about the supporting rods 9 or 19 as the case may be. The straps 30 will preferably be made of a light resilient material so that when a child's legs extend between a pair of these straps there will be no uncomfortable pressure applied to the person of the child.

In FIGS. 3 and 3ª it is proposed that in lieu of the individual straps and spacer blocks, the closure means is in the form of a single sheet which may be woven or stamped into the form shown in FIG. 3. As shown, the individual straps are indicated at 35, these straps being suitably spaced by slots 36 and are united at their upper ends by the continuous strip 37 and at their lower margin by the continuous strip 38. The upper and lower strips 37 and 38 are formed with openings 39 through which rivets or other fastening means can extend when these parts are mounted about the cross rods 9 and 19.

In FIG. 4 a spring roller is shown at 40 mounted in end blocks 41 seated in socket 42 formed by offset portions in the vertical gate frame. This spring roller 40 may contain a slotted, perforated or open-work sheet 43 having a ring 44 for looping about the hook 45. In this form of the invention the sheet 43, regardless of its structure will be rolled about a spring roller of the type used in curtains and indicated by reference character 40. When the leg openings are to be closed, the sheet 40 can readily be unrolled so that the ring 44 can be looped about the hook 45.

In FIG. 5 a wire spring frame of sinuous form is provided, this frame 50 terminating in loops 51 which are wrapped about the uprights 25 of the swinging gate. The medial portion of the frame 50 has a relatively wide loop 53 offset at its upper portion at 54 to extend around the center frame members 26, this center loop 53 thereby engaging the medial cross bar 19 and is limited in its downward movement thereby. In use when the leg openings are to be closed, this sinuous frame 50 can be slid upwardly on the guide bars 25 and the center portion can extend over hook members 56 so that the structure will be supported in its upper position.

It will be apparent from an inspection of the drawings and claims in this application that the inventive concept comprehends a leg opening closure means mounted upon the gate and normally lying in and movable in the plane of the gate, as distinguished from the known prior art wherein the leg opening closure means is in the form of a swinging structure mounted for pivotal movement transverse to the gate structure.

The invention further contemplates leg opening closure means which are substantially permanently associated with the gate structures so that there is no operation of any of the elements to position the parts, see FIG. 1, the structure simply permitting the child's legs to extend between the flexible partitions or straps normally closing the leg openings.

What I claim is:

1. A baby seat assembly for use in nesting carriers comprising a gate member having hinged mountings at its upper end, a panel member hinged at its base to the bottom portion of the gate member, said gate member being formed with leg openings, a seat structure hingedly mounted medially of the gate structure, stop means on one of said swinging members for supporting the seat structure in a horizontal position, means connecting and limiting the relative movement between the swinging gate and the panel structure, and means mounted on the gate member for closing said leg openings when the seat structure is in horizontal position, said last-named means being movable in the plane of the member formed with leg openings to permit a child's legs to extend therethrough when the seat is in horizontal seating position.

2. The structure of claim 1 characterized in that the means mounted on the gate for closing the leg openings comprises a fabricated guard which is slidably fixed to portions of the gate.

3. The structure of claim 1 characterized in that the means mounted on the gate for closing the leg openings comprises a fabricated guard which is slidably fixed to portions of the gate and additional means are provided for securing the slidable means in its upper position closing the leg openings.

4. A baby seat assembly for use in nesting carriers comprising, a gate member having hinged mountings at its upper end, a panel member hinged at its base to the bottom portion of the gate member, one of the members being formed with leg openings, a seat structure hingedly mounted medially of the gate structure, stop means on one of said swinging members for supporting the seat structure in a horizontal position, means connecting and limiting the relative movement between the swinging gate and the panel structure, and a leg opening closure member for closing said leg openings when the seat is in horizontal position entirely supported on the member formed with leg openings and slidable in the plane thereof from an upper position closing the leg openings to a lower position opening the leg openings.

5. In a folding seat structure for use in a telescoping carrier having a swinging gate formed with leg openings at its upper portion, a seat structure including in combination with a swinging gate, a panel structure forming a seat back member swingably secured to the lower portion of the gate, a seat hingedly connected to one of said members, stop means on one of said swinging members for supporting the seat in a horizontal position, means connecting and limiting the relative movement between the swinging gate and the panel structure, and a flexible structure fixed to opposite sides of the structure defining the leg openings and including straps defined by elongated slots for normally closing the leg openings when the seat is in horizontal position.

6. In a folding seat structure for use in a telescoping carrier having a swinging gate formed with leg openings at its upper portion, a seat structure including in combination with a swinging gate, a panel structure forming a seat back member swingably secured to the lower portion of the gate, a seat hingedly connected to one of said members, stop means on one of said swinging members for supporting the seat in a horizontal position, means connecting and limiting the relative movement between the swinging gate and the panel structure, and a flexible assembly normally fixed at its opposite sides to the opposite sides of the leg openings in said gate, said flexible assembly including a plurality of flexible straps, said straps being relatively adjustable and closing said leg openings regardless of the position of said seat.

7. In a folding seat structure for use in a telescoping carrier having a swinging gate formed with leg openings at its upper portion, a seat structure including in combination with a swinging gate, a panel structure forming a seat back member swingably secured to the lower portion of the gate, a seat hingedly connected to one of said members, stop means on one of said swinging members for supporting the seat in a horizontal position, means connecting and limiting the relative movement between the swinging gate and the panel structure, and a flexible assembly fixed to the gate at opposite sides of the leg openings including a plurality of flexible resilient straps, said straps being relatively adjustable and closing said leg openings regardless of the position of said seat.

8. A baby seat assembly for use in nesting carriers comprising a gate member having hinge mountings at its upper end, a panel member hinged at its base to the bottom portion of the gate member, said gate member being formed with a leg opening for the passage of legs therethrough, a seat structure hingedly mounted on one of said members and movable from a horizontal seating position to an upper position against the member to which it is hinged, means on the other member for holding the seat structure in horizontal seating position, means for limiting the relative movement between the gate and panel members, leg opening closure means supported by and mounted on said gate member and adapted to close said leg opening, said closure means being contained wholly within the frame of said gate member and including portions which are movable in the plane of the gate member to provide passageways permitting the projection of a child's legs through the leg opening when the seat is occupied.

9. In a folding seat structure for use in a telescoping carrier having a swinging gate formed with leg openings at its upper portion, a seat structure including in combination with a swinging gate, a panel structure forming a seat back member swingably secured to the lower portion of the gate, a seat hingedly connected to one of said members, stop means on one of said swinging members for supporting the seat in a horizontal position, means connecting and limiting the relative movement between the swinging gate and the panel structure, a spring actuated roller mounted on the swinging gate below the leg openings, a flexible structure mounted on said roller and adapted to be unrolled from the roller to close the leg openings, and means for retaining the flexible structure in a position to close the leg openings.

References Cited in the file of this patent

UNITED STATES PATENTS

| | | |
|---|---|---|
| 1,408,729 | Green | Mar. 7, 1922 |
| 2,769,645 | Young | Nov. 6, 1956 |
| 2,813,725 | Hoedinghaus et al. | Nov. 19, 1957 |
| 2,837,344 | Young | June 3, 1958 |
| 2,860,886 | Schweitzer | Nov. 18, 1958 |